July 15, 1924.
S. HILLER
1,501,775
PROCESS FOR THE MANUFACTURE OF HIGH GRADE FLOURS FROM FISH AND LIKE MATERIALS
Filed Jan. 14, 1924
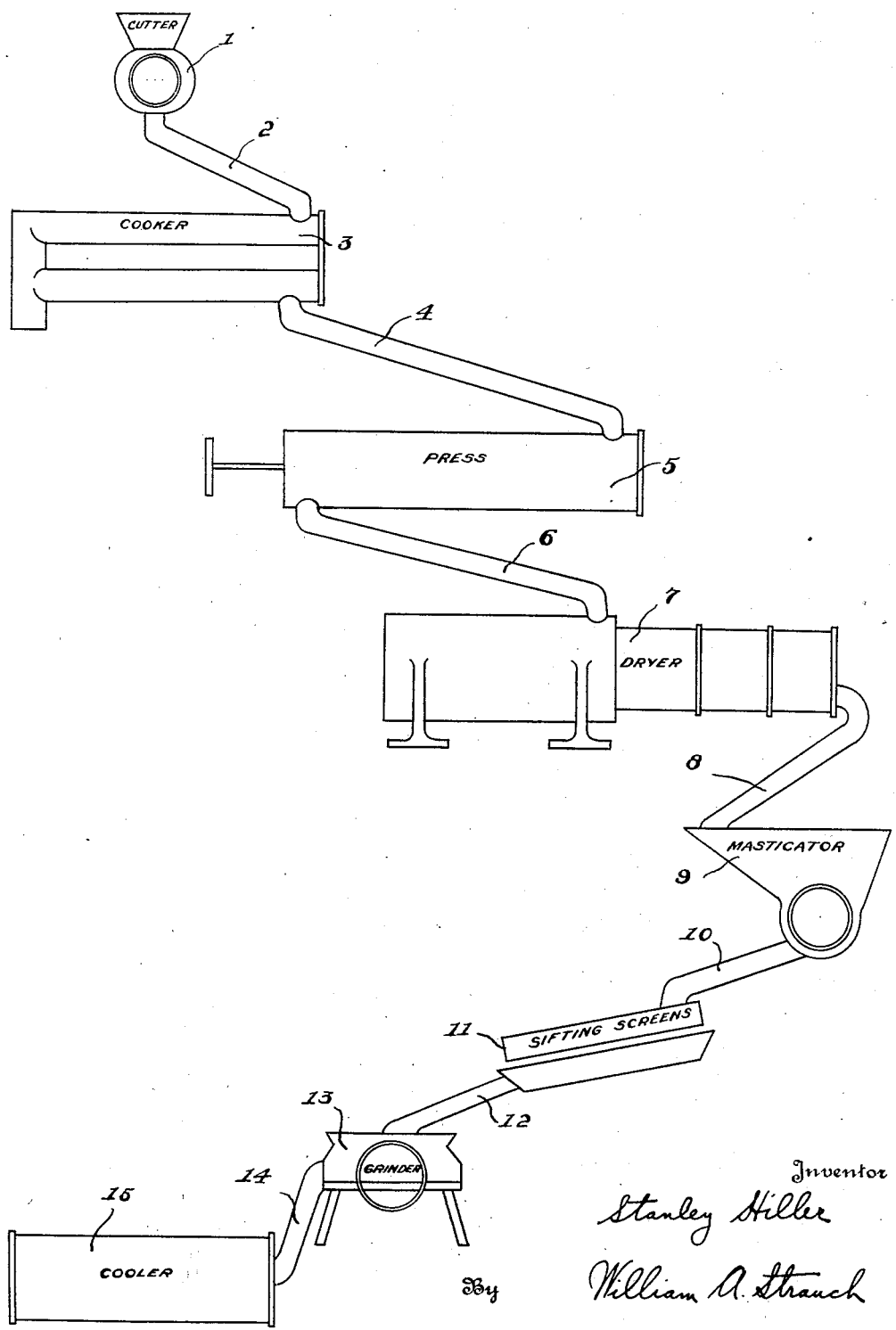
Inventor
Stanley Hiller
By William A. Strauch
285-1 Attorney Patented July 15, 1924.

1,501,775

UNITED STATES PATENT OFFICE.

STANLEY HILLER, OF SAN JOSE, CALIFORNIA, ASSIGNOR TO ROY L. DAILY, OF SAN FRANCISCO, CALIFORNIA; R. R. BELLINGALL, OF OAKLAND, CALIFORNIA; AND STANLEY HILLER, OF SAN JOSE, CALIFORNIA.

PROCESS FOR THE MANUFACTURE OF HIGH-GRADE FLOURS FROM FISH AND LIKE MATERIALS.

Application filed January 14, 1924. Serial No. 686,136.

*To all whom it may concern:*

Be it known that I, STANLEY HILLER, a citizen of the United States, and a resident of San Jose, county of Santa Clara, State of California, have invented certain new and useful Improvements in Processes for the Manufacture of High-Grade Flours from Fish and like Materials, of which the following is a specification.

The present invention relates to improved processes for the manufacture of high grade flours from fish and like materials.

More particularly the invention relates to improvements in processes of the character described by which a food fit for human consumption may be produced.

Heretofore meal from fish, fish waste and like oil bearing materials has been produced by first extracting the oils and thereafter drying and grinding the residue. Such meals have, however, been of a quality unfit for human consumption and have been usable only as fertilizers and cattle food. In particular fish meals heretofore produced have had a percentage of bone content so high that the meal would be highly injurious if used as a food for human beings.

I have discovered that it is possible to effect a commercially satisfactory and practical separation of the bone content in fish or other bone bearing materials of the character described with the result that a flour may be produced which is of high protein content and valuable as food for human beings.

The success of the separation depends to a large extent upon the manner of treating the meal in production thereof. However, the manner of treatment may vary widely as will appear more fully hereinafter.

The main feature of the invention may be said to comprise the preparation of a meal of such quality that the bone remains in more or less appreciable sections or lengths, which may be so treated as to remove the flesh portion easily from the pieces of bone; and at the same time or thereafter, reducing or breaking the flesh from the bone. After the breaking of the flesh content the mass is then passed over a set of sifting screens to separate the dried flesh and bone, or may be passed through chambers for separating the flesh from the bone by an air flotation process, or otherwise.

The accompanying drawing shows in diagram the apparatus and general arrangement thereof as used in commercial practice to carry out one form of the invention. It is to be understood however that many other arrangements may be utilized. In the preferred forms the invention is carried out in continuous manner, but it is also applicable to batch processes.

In carrying out the invention, the fish are first preferably cleaned, the heads and other parts cut off, and the entrails removed. This preliminary cleaning and treatment, however, is not essential and may be dispensed with in certain cases, as for example in handling certain kinds of fish. The fish is then fed into a cutter 1, which is in practice of the commonly known meat grinder type, but may be of any well known form for reducing and cutting the fish into relatively small parts. From the cutter the fish is carried by means of a conveyor 2, or otherwise, and delivered into a cooker 3. The mass is then cooked, under pressure, to break down the oil cells. In practice material is fed from the cutter continuously and under cover to the cooker, and is continuously passed through the pressure cooker. From the cooker the cooked material is passed through a conveyor or otherwise to a press (5) where the greater proportion of oil and water is extracted by pressure.

In practice the material is passed from the cooker to the press continuously under cover, and while hot. The material also passes continually through the press, and as a result of pressing the material while hot a greater efficiency of extraction of the oils results. From the press the material passes through passage (6) or otherwise to a dryer (7) and is therein thoroughly dried in a manner to prevent burning or otherwise tainting the taste of the meal. In practical operation the feed from the press to the dryer is continuous and under cover, and the passage through the dryer is continuous, drying being carried out in direct contact with the gases of combustion.

The volume of air supplied to the combustion chamber and the arrangement of the chamber is such, however, that complete combustion of the fuel supply occurs and the temperature of the mixture of air and gases is maintained at a point to cause drying of the pressed material without burning. In this manner, efficient and thorough drying of the material is carried out in direct contact with the products of combustion, but without causing any appreciable degree of taint affecting the taste of the dried material.

From the dryer, the thoroughly dried and preferably hot material is conveyed through (8) or otherwise, preferably in continuous manner and under cover, to a masticator (9). Masticator (9) is preferably of any well known type such for example as is used on farms and as manufactured by the International Harvester Company, and comprises a series of rotating dogs which act on the dry material to break up the dry flesh portion thereof and to separate it from the bone. The bone being hard and the flesh being thoroughly dry and more or less brittle, the result of the mastication is that the flesh is separated and reduced to relatively fine particles while the bone remains in relatively large particles. It will be understood that any treatment which produces this result may be used to replace the masticator described, and that although greater efficiency is attained in mastication while the material is hot because greater dryness is assured, so long as the result described is effected the condition of the material during the operation may differ widely within the scope of the invention.

Having passed through the masticator, the dry and preferably hot mixture of fine dry flesh content and relatively coarse bone content is treated to effect a sufficient separation of the bone and flesh so that the flesh becomes usable as food for human consumption. This treatment or step may be carried out in different ways, and although preferably carried out while the material is hot for greater efficiency, so long as the separation is effected the condition of the material may vary widely in this respect and also with respect to the degree of dryness maintained.

The material is passed preferably under cover and continuously through (10) or otherwise to separating means (11). In practice (11) comprises shaking or rotary screens of a mesh which permits the major part of flesh portions to pass therethrough and prevents the passage of the major part of the bone. In practical operation a 20-mesh screen is utilized. The screens are pitched downward from the feed end so that the material is advanced there-across and is then passed from the screens where it may be further treated and sacked to be used as fertilizer, being substantially composed of the bone content.

The sifted flesh content is collected beneath the screens and is passed through (12) or otherwise to a grinder (13) where it is reduced to a flour. The sifting and grinding operations are preferably continuous and carried out under cover to avoid loss of material, and to maintain the material as far as possible in warm or heated condition, in this manner contributing to the commercial success and efficiency of the process.

The invention may however, be carried out in discontinuous manner and as a batch process, without the covering to avoid waste and to maintain the heated condition of the material.

The sifting screens may be replaced by means for introducing the meal from the masticator into a device for separating the flesh content from the bone by means of air currents or air flotation. In this form of separator, the difference in density of the relatively fine flesh particles and the relatively coarse bone is utilized to effect the separation.

From this separator the flesh portion is also passed to a grinder and reduced to flour. In the preferred embodiment, the flesh part is sifted and ground while hot and the material is passed from the grinder through passage (14) or otherwise, to a cooler (15) where it is cooled to the point of permitting immediate sacking or other packing for shipment.

It will be understood that for handling large quantities of material rapidly and at a minimum cost, a continuous plant is provided. For smaller quantities, the invention may be carried out as a discontinuous or batch process. The arrangement for handling the material while hot and maintaining the material covered, at least until drying is completed, prevent offensive odors and rapid deterioration of the material during the treatment, in addition to increasing the economy of operation and efficiency of the apparatus. After the material has been dried there is found in practice no tendency toward rapid deterioration, and no offensive odors are emitted. Covering of the material from this point on to prevent contact with the air serves however, to keep it hot and thoroughly dry, thereby increasing the efficiency of the mastication, sifting or other separation apparatus, and the final grinding into flour.

It will be understood that by bringing the various apparatus into close relation, conveyors may be largely eliminated and gravity feed arrangements may be utilized, in which event the covering may be to some extent removed if desired, without materially lowering the temperature of the materials in the various stages. It is to be understood that the arrangements of apparatus for conveying the materials will depend largely on the design of the plant used and may accordingly be varied widely according to the choice made and well within the range of ordinary engineering skill.

Having described preferred embodiments of the invention, what is desired to be secured by Letters Patent and claimed as new is:

1. A process for manufacturing fish flour which comprises cutting the fish; cooking the fish under pressure; pressing the cooked fish to extract the oil therefrom; drying the solid residue from the press; masticating the dried material without substantially reducing the size of the bone particles whereby the flesh is broken from the bone; and treating the masticated material to remove the major portion of the bone content therefrom.

2. A process for manufacturing fish flour which comprises cutting the fish into relatively small particles; cooking the cut fish; pressing the cooked fish to extract the oil therefrom; drying the solid residue from the press; treating the dried material in a manner to break the flesh content from the bone without materially reducing the size of the bone particles; and separating the flesh content from the bone content.

3. A continuous process for manufacturing high grade fish flour which comprises the steps of cutting fresh fish to relatively small particles; cooking the freshly cut fish; pressing the cooked fish while hot to extract the oil therefrom; drying the solid residue from the press by the application of heat thereto; treating the dried material while hot to break the flesh portion from the bone without materially reducing the size of the bone particles; separating the flesh content from the bone by sifting; and grinding the separated flesh content to produce flour.

STANLEY HILLER.